(No Model.)

J. F. BELLEVILLE.
FEED WATER APPARATUS.

No. 373,216. Patented Nov. 15, 1887.

WITNESSES:
E. B. Bolton

INVENTOR:
Julien François Belleville,
By Henry Connett
Attorney.

United States Patent Office.

JULIEN FRANÇOIS BELLEVILLE, OF PARIS, FRANCE.

FEED-WATER APPARATUS.

SPECIFICATION forming part of Letters Patent No. 373,216, dated November 15, 1887.

Application filed August 2, 1887. Serial No. 245,933. (No model.) Patented in France April 30, 1887, No. 170,304.

*To all whom it may concern:*

Be it known that I, JULIEN FRANÇOIS BELLEVILLE, a citizen of the French Republic, and a resident of Paris, France, have invented certain Improvements in Feed-Water Apparatuses for Steam-Generators, (for which a patent for fifteen years has been granted in France, dated April 30, 1887, Serial No. 170,304,) of which the following is a specification.

My invention relates to an apparatus for heating feed-water prior to its introduction into the generator, the object being to effect the precipitation of the salts held in solution therein without material loss of heat.

In order to precipitate the calcareous salts held in solution, and most especially the sulphate of lime, the following conditions are necessary: First, the temperature of the feed-water should be raised to at least 155° centigrade; second, the feed-water should be injected into the heater in the form of spray or in a state of fine subdivision; third, the incoming feed-water should be mingled thoroughly with the steam from the generator in order to transform the gypsum from the water into anhydrous sulphate, and, fourth, this contact of the water and steam should be prolonged sufficiently to permit the precipitation of the anhydrous sulphate before the feed-water passes into the generator.

My present invention furnishes an apparatus wherein these conditions are carried out, and it may be applied to any form of generator, either land or marine, tubular or not. It is well adapted for use in such a generator as that illustrated and described in my Letters Patent No. 336,282, dated February 16, 1886, and is an improvement in the class of feed-water apparatuses illustrated in my Letters Patent No. 336,283, dated February 16, 1886.

In order to dry the steam that passes through the heater or apparatus as much as possible before it escapes on its way to the engine, as well as to eliminate the water held by suspension therein, I employ deflecting-plates and partitions for it to pass around and subject it in its flow to abrupt changes of direction. This latter treatment has the effect of throwing out the particles of water from the steam, these particles being carried on and out of the current by virtue of their greater inertia when the abrupt changes of direction are effected.

My invention is illustrated in the accompanying drawings, wherein—

Figure 1:
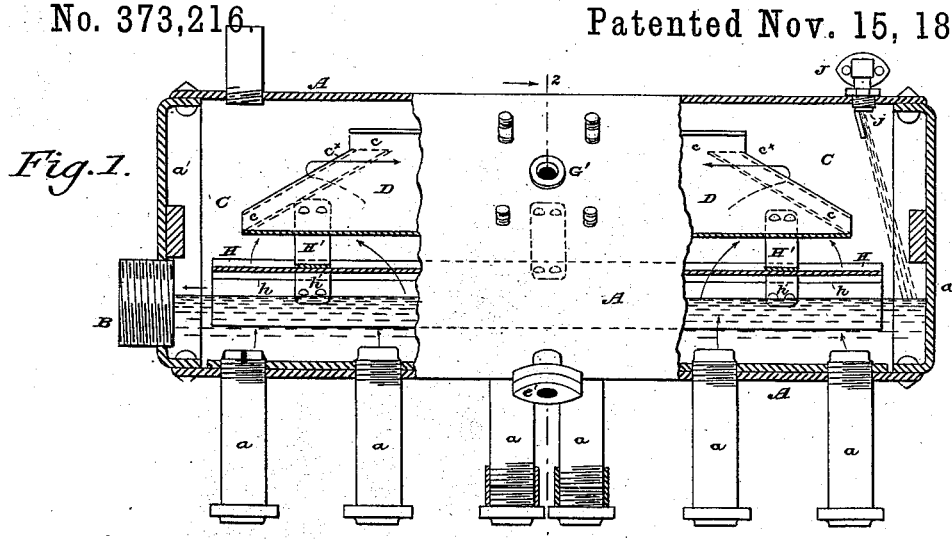
Figure 3:
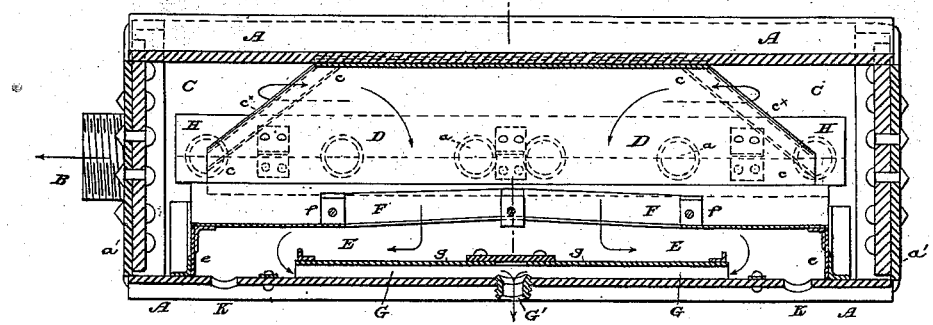
Figure 2:
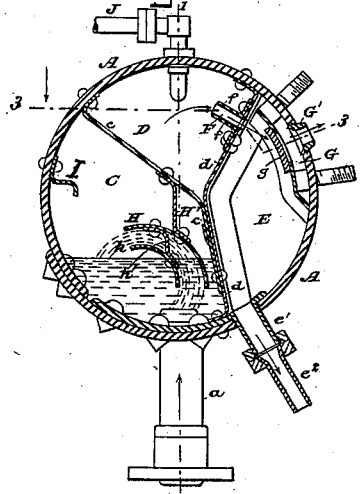
Figure 4:
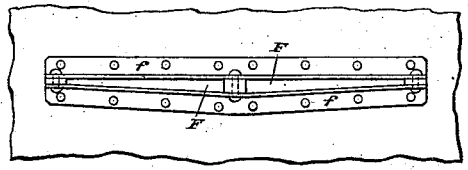

Figure 1 is a sectional elevation, the ends being in section in the plane indicated by line 1 1 in Fig. 2. Fig. 2 is a transverse section of the apparatus taken on the plane indicated by line 2 2 in Figs. 1 and 3. Fig. 3 is a longitudinal section of the apparatus on the planes indicated by line 3 3 in Fig. 2. Fig. 4 is a fragmentary detached view showing the mouth of the orifice F and the adjutage leading from the second to the third drying-compartment of the apparatus.

A represents the shell or drum of the apparatus, and $a$ $a$ the pipes or tubes connecting the apparatus with the steam-generator (not shown) and through which the steam enters the drum A. Where the apparatus is connected with a generator made up of tubes or tubular sections, like that shown in my former patent, each of the tubes $a$ will connect with one of these sections.

$a'$ $a'$ are the heads or ends of drum A.

B is the feed-water outlet, with a coupling or spud, to which is connected the return-pipe (not shown) leading down to the bottom sections or the lower part of the generator.

C is the first or primary compartment of the drum, bounded and limited by the ends $a'$ $a'$ of the drum, the back part of the drum-wall, and the two sheet-metal partitions $c$ and $d$. The partition $c$ is sloped at its ends at its upper part, as clearly shown in $c^\times$ in Fig. 1.

D is the second compartment of the drum, bounded and limited by the crown of the drum, by the partition $c$, and by a part of the partition $d$. This second compartment is open at its ends, whereat it communicates with the compartment C.

E is the third compartment, limited and bounded by the front wall or shell of the drum, by the partition $d$, and by the end plates, $e$ $e$, (seen in Fig. 3,) which close its extremities. The compartment E communicates with the compartment D by an orifice, F. At its lower part it also communicates with the bottom of the generator by a return-pipe, $e^2$, coupled to an outlet-nipple, $e'$. (Seen best in Fig. 2.)

The orifice F is seen in plan in the detached view, Fig. 4. It is formed in the partition $d$ and is bounded by a coaming, $f$, of angle-iron, which projects into compartment D, thus forming an elongated adjutage connecting compartments D and E.

G is a channel or inclosed space formed by securing a trough-like plate, *g*, to the wall or shell of the drum in compartment E. It is open at its ends, and houses or screens the steam-outlet G'. As many of these steam-outlets will be employed as may be required; but they should all open out from the space or channel G.

H and *h* are curved plates arranged concentrically, as shown, or substantially so. They are in compartment C, and are connected together by bars or stays *h'* and secured to partition *c* by stays H'. These plates serve as deflectors for the entering steam and are arranged over the steam-inlets *a a*, where the latter open into the drum. The stays H' *h'* will be so constructed and arranged as to interfere as little as possible with the general circulation of the steam and water.

I is a sheet-metal screen secured to the wall of the drum within compartment C. The object of this screen is to prevent the water projected against the curved wall of the drum from rising along said wall and mingling with the steam in the upper part of compartment C.

J is the feed-water inlet at the top of the drum near the end. This inlet is provided with a deflecting-plate, *j*, which directs the incoming water toward the lower angle of the drum (see Fig. 1) and breaks it up into a very fine spray.

Hand-holes K, for access to the interior of the drum, each with a suitable cover, will be provided.

The operation of my feed-water apparatus is as follows: In generators constructed according to my patent before named the water is regulated so as to stand at such a level, normally, that the steam passes out to the drum A laden with from eight to ten times its weight of water. This mixture of water and steam impinges against the curved plates H *h*. The steam disengages from the water and rises to the upper part of compartment C, while the water, following the current-deflecting plates, is thrown against the wall of the drum A, and finally passes off at the outlet B. Thence it passes to the lower part of the generator, after having been mixed with the incoming feed-water, as will be hereinafter described. The steam thus separated from the water is still very humid. It passes to the right and left toward the ends of the drum, where its direction or course is abruptly changed one hundred and eighty degrees, in order that it may enter the second compartment, D. In this change of direction of the current of steam the particles of water carried by it, owing to their greater inertia, abandon the steam and are projected against the ends of the drum. By reason of the sloping of the ends of partition *c*, as seen at $c^x$ in Fig. 3, the current of the steam is established, principally, at the upper part of the compartment C. In order to pass from the compartment D to the compartment E, the steam changes the direction of its flow at right angles, which causes a further ejectment of the particles of water carried by it. The steam passes through the adjutage at orifice F. This orifice is narrowed near its ends, as seen in Fig. 4, the object being to insure substantially the same velocity in the flow of steam throughout the entire length of the orifice. The final drying of the steam is effected in the compartment E. The current formed in and directed by the adjutage at orifice F strikes against the inclined face of the plate *g*, (which forms the chamber or channel G,) and the particles of water in the steam adhere to the plate *g*, and finally flow thence down to the bottom of compartment E by virtue of the adhesion of the drops to the surfaces. The steam changes its direction ninety degrees, and flows right and left to the open ends of channel G, then turns one hundred and eighty degrees, and flows back again in the opposite direction until it reaches the steam-supply outlet G', at which it escapes from the drum. The water separated from the steam in compartment E finally flows off at the outlet *e'* and pipe $e^2$ to the bottom or lower part of the generator. The steam passing off at outlet G' will be as dry as it is possible to make it without superheating.

The feed-water entering the drum at inlet J is spread into a thin fan-like sheet by the deflector *j*, and directed obliquely downward toward the end of the drum. The falling spray mingles with the water in the lower part or bottom of the drum, brought in by the steam. The whole body of water flowing along the bottom of the drum toward the outlet B must pass over or across the mouth of the steam-inlets *a a*, and the jets of steam effect a most thorough agitation of the water, at the same time heating it up to the same temperature as the steam itself, or nearly so. It follows that when the pressure of the steam, and consequently its temperature, is sufficiently high—that is to say, when the tension of the steam is not less than eight atmospheres—the precipitation of the calcareous salts in a pulverulent state will be thoroughly effected by the disengagement of carbonic acid from the bicarbonate of lime and the dehydration of the sulphate of lime contained in the feed-water.

Having thus described my invention, I claim—

1. The drum or elongated vessel, as A, arranged with its axis substantially horizontal, and provided with a feed-water inlet, as J, at or near one end, a feed-water outlet, as B, at its other end, near its bottom, and one or more uncovered steam-inlets in its bottom, over the open mouths of which the feed-water flows in its passage from the inlet to the outlet through said vessel, as set forth.

2. The drum or elongated vessel, as A, arranged with its axis substantially horizontal, and provided with a feed-water inlet, as J, at or near one end, a feed-water outlet, as B, at the other end, near its bottom, a steam inlet or inlets, as $a$, in its bottom, with uncovered mouths, over which mouths the water flows in passing from the inlet to the outlet, and a curved deflecting-plate arranged over said steam-inlet above the feed-water level, substantially as set forth.

3. The elongated drum or vessel, as A, arranged with its axis substantially horizontal, and provided with a feed-water inlet at one end and a feed-water outlet at the other end, near its bottom, a steam inlet or inlets in its bottom, with uncovered mouths, over which mouths the water flows in its passage from one end of the drum to the other, a steam-outlet above the feed-water level in the drum, deflectors in the nature of partitions arranged between the feed-water level and the steam-outlet, whereby the current of steam is abruptly deflected and thereby freed from water held in suspension, and an outlet, as $e$, for the water thus separated from the steam, substantially as set forth.

4. The drum or vessel A, divided by partitions into three compartments, C, D, and E, and having inlets and outlets for the steam and feed water, a plate, $g$, arranged over the steam-outlet, and an orifice, F, having an adjutage arranged in the partition between compartments D and E, to cause the steam to impinge obliquely on plate $g$, substantially as and for the purpose set forth.

5. In a feed-water heater, the drum or elongated vessel A, provided with a feed-water inlet, J, at its upper side, near one end, having a deflector, $j$, a feed-water outlet at its other end, a steam-inlet in its bottom, over which the feed-water flows, a curved deflector over said steam-inlet, a partition, $c$, with sloping ends, a partition, $d$, with an orifice, F, a chamber, E, having a water-outlet, $e'$, and a plate, $g$, arranged over the steam-outlets in chamber E, substantially as set forth.

In witness whereof I have hereunto signed my name in the presence of two subscribing witnesses.

JULIEN FRANÇOIS BELLEVILLE.

Witnesses:
LOUIS DELAUNAY,
HENRY HUBAC.